(12) United States Patent
Huang et al.

(10) Patent No.: US 11,074,052 B2
(45) Date of Patent: Jul. 27, 2021

(54) AUTOMATIC COMPILING METHOD FOR USE IN GRAPHICAL PROGRAMMING

(71) Applicant: South China University of Technology, Guangzhou (CN)

(72) Inventors: Han Huang, Guangzhou (CN); Liang Qin, Guangzhou (CN); Zhanning Liang, Guangzhou (CN); Zhifeng Hao, Guangzhou (CN); Zhun Fan, Guangzhou (CN)

(73) Assignee: South China University of Technology, Guangzhou (CN)

( * ) Notice: Subject to any disclaimer, the term of this patent is extended or adjusted under 35 U.S.C. 154(b) by 0 days.

(21) Appl. No.: 16/607,360

(22) PCT Filed: Nov. 16, 2017

(86) PCT No.: PCT/CN2017/111231
§ 371 (c)(1),
(2) Date: Oct. 23, 2019

(87) PCT Pub. No.: WO2018/196345
PCT Pub. Date: Nov. 1, 2018

(65) Prior Publication Data
US 2020/0125337 A1 Apr. 23, 2020

(30) Foreign Application Priority Data

Apr. 24, 2017 (CN) .......................... 201710269436.4

(51) Int. Cl.
*G06F 8/35* (2018.01)
*G06F 8/34* (2018.01)
*G06F 8/41* (2018.01)

(52) U.S. Cl.
CPC .................. *G06F 8/35* (2013.01); *G06F 8/34* (2013.01); *G06F 8/447* (2013.01)

(58) Field of Classification Search
CPC ............... G06F 8/35; G06F 8/34; G06F 8/447
(Continued)

(56) References Cited

U.S. PATENT DOCUMENTS 5,732,277 A * 3/1998 Kodosky ............. G06F 3/04817
717/125
6,173,438 B1 * 1/2001 Kodosky ................... G06F 8/34
717/105
(Continued)

FOREIGN PATENT DOCUMENTS

| CN | 102915242 | 2/2013 |
| CN | 105739974 | 7/2016 |

(Continued)

OTHER PUBLICATIONS

Adve, Vikram S., et al. "An integrated compilation and performance analysis environment for data parallel programs." Supercomputing'95: Proceedings of the 1995 ACM/IEEE Conference on Supercomputing. IEEE, 1995.pp. 1-18 (Year: 1995).*
(Continued)

*Primary Examiner* — Satish Rampuria
(74) *Attorney, Agent, or Firm* — JCIPRNET

(57) ABSTRACT

The invention provides an automatic compiling method for graphical programming, which mainly comprises the following steps of allocating a graphical program memory, allocating a graphical program thread, analyzing a graphical program storage structure and generating a graphical program executable file. An executable file corresponding to a graphical program is generated based on automatic compiling of graphical programming, a user freely combines graphical modules according to functional requirements to form a program, an automatic compiling method for graphical programming is used for compiling the graphical program, and a file which can be directly operated in a controller is generated. An obscure executable file
(Continued)

corresponding to the graphical program can be automatically generated without needing complicated compiler or compiling environment in the method, and then the generated executable file can be transmitted to the controller through data exchange for running, so as to achieve an action effect corresponding to the graphical program.

5 Claims, 1 Drawing Sheet

(58) Field of Classification Search
USPC .................................................. 717/100–123
See application file for complete search history.

(56) References Cited

U.S. PATENT DOCUMENTS

| | | | | |
|---|---|---|---|---|
| 6,437,805 | B1 * | 8/2002 | Sojoodi | G05B 19/0426 |
| | | | | 715/763 |
| 8,423,981 | B2 * | 4/2013 | Hudson, III | G06F 8/34 |
| | | | | 717/140 |
| 2004/0088666 | A1 | 5/2004 | Poznanovic et al. | |
| 2005/0149908 | A1 * | 7/2005 | Klianev | G06F 9/5038 |
| | | | | 717/109 |

FOREIGN PATENT DOCUMENTS

| | | |
|---|---|---|
| CN | 107168698 | 9/2017 |
| WO | WO 2018/196345 | 11/2018 |

OTHER PUBLICATIONS

Newman, William M. "A system for interactive graphical programming." Proceedings of the Apr. 30—May 2, 1968, spring joint computer conference. 1968.pp. 47-54 (Year: 1968).*

Bhattacharyya, Shuvra S., Praveen K. Murthy, and Edward A. Lee. "Converting graphical DSP programs into memory constrained software prototypes." Proceedings Sixth IEEE International Workshop on Rapid System Prototyping. Shortening the Path from Specification to Prototype. IEEE, 1995.pp. 194-200 (Year: 1995).*

Golin, Eric J., and Tom Magliery. "A compiler generator for visual languages." Proceedings 1993 IEEE Symposium on Visual Languages. IEEE, 1993.pp. 314-321 (Year: 1993).*

Costagliola, Gennaro, et al. "Automatic generation of visual programming environments." Computer 28.3 (1995): pp. 56-66. (Year: 1995).*

Sherwood, Timothy, et al. "Automatically characterizing large scale program behavior." ACM SIGPLAN Notices 37.10 (2002): pp. 45-57. (Year: 2002).*

Calidonna, Claudia Roberta, Maurizio Giordano, and M. Mango Furnari. "A graphic parallelizing environment for user-compiler interaction." Proceedings of the 13th international conference on Supercomputing. 1999.pp. 238-245 (Year: 1999).*

International Search Report and the Written Opinion dated Feb. 14, 2018 From the International Searching Authority Re. Application No. PCT/CN2017/111231 and Its Translation of Search Report Into English. (10 Pages).

* cited by examiner

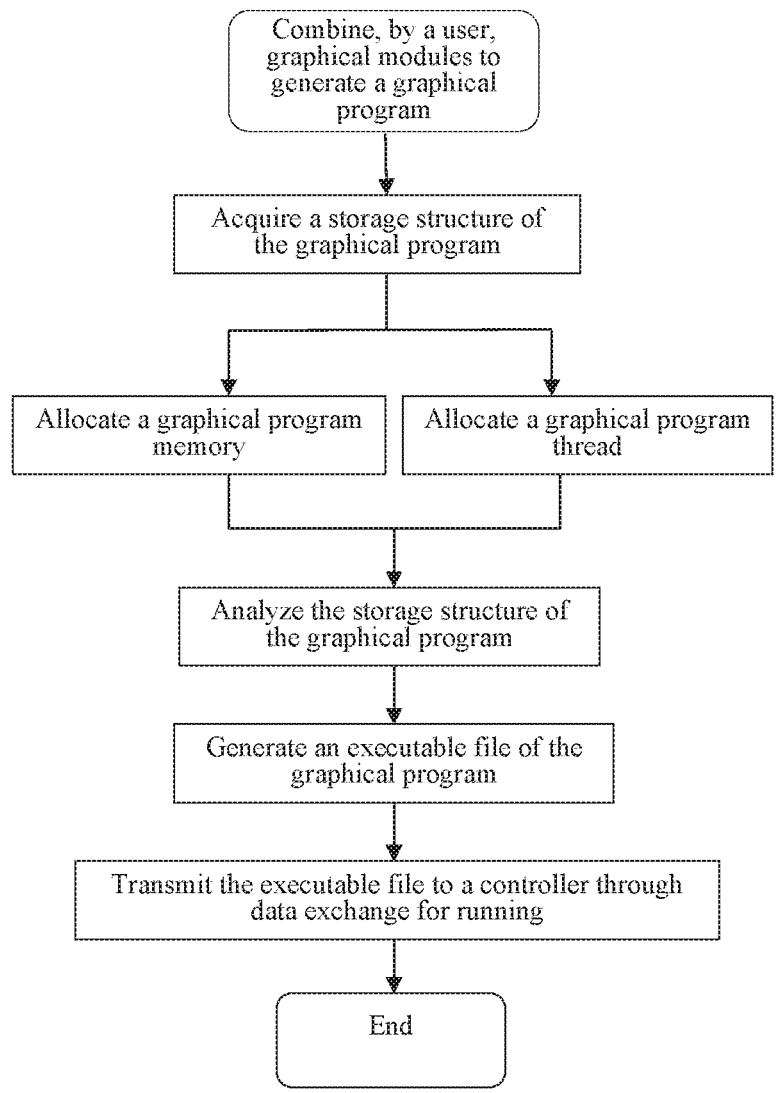

AUTOMATIC COMPILING METHOD FOR USE IN GRAPHICAL PROGRAMMING

RELATED APPLICATIONS

This application is a National Phase of PCT Patent Application No. PCT/CN2017/111231 having International filing date of Nov. 16, 2017, which claims the benefit of priority of Chinese Patent Application No. 201710269436.4 filed on Apr. 24, 2017. The contents of the above applications are all incorporated by reference as if fully set forth herein in their entirety.

FIELD AND BACKGROUND OF THE INVENTION

The present invention mainly relates to the field of graphical programming, and more particularly, to a compiling method for graphical programming.

With the continuous development of Internet technology and society, the Internet has become closely related to our life and has deeply affected various aspects of our life. Meanwhile, people begin to pay attention to programming education for teenagers and children. In an interview accepted by Jobs before his death, he once said that everyone in this country should learn programming because it teaches you how to think. Meanwhile, many celebrities including Bill Gates, Mark Zuckerberg and Jack Dorsey came to call for teenagers and children to participate in computer programming. Perhaps it is because that the concept is deeply rooted in the hearts of the people, technology giants are also involved in programming education for teenagers and children. As a result, a graphical programming language emerged at the right moment, which was simple without complicated syntax knowledge, and children only need to drag the modules to combine freely to achieve some specific effects. Graphical programming can enable children to develop their imagination and creativity to a great extent and cultivate their basic programming logic and thinking. At present, graphical programming software in the market is basically that each graphical object is a code block, they can be spliced together to create simple functions, then the simple functions are combined one by one and then converted into some high-level language, such as Python, JavaScript and other high-level languages, and then a code is transmitted to a controller, and the target code is analyzed by a compiler in the controller, which comprises preprocessing, compiling and assembling to finally generate an executable machine language. The compiling process is too complicated and too professional, with high learning costs and high requirements on the controller, thus virtually increasing development costs of the software. Moreover, in some specific circumstances, it is not necessary to construct a complicated compiler to realize compiling work, and in view of this situation, an automatic compiling method for graphical programming that is simple and easy to implement is proposed.

SUMMARY OF THE INVENTION

The present invention provides a simple and easy-to-implement automatic compiling method for graphical programming aiming at the fact that compiling technologies in the current graphical programming field is too complicated and requires too much. The present invention is intended to provide an efficient and simple compiling method, through which an executable file of a program in a controller is automatically generated, so as to achieve an operation effect of the program, and the specific technical solutions are as follows.

An automatic compiling method for graphical programming comprises the following steps of:
(a) freely combining, by a user, graphical modules to generate a graphical program;
(b) allocating a memory for a graphical program to generate a graphical program memory allocation table, so as to realize memory management and operation of a controller;
(c) allocating threads for a graphical program to analyze a storage structure of a graphical program to acquire a graphical program thread allocation table, so as to realize multi-thread execution of the graphical program and implement thread management;
(d) analyzing, by a graphical program analysis module, a position of each graphical module in the graphical program according to the storage structure of the graphical program to acquire an extra instruction that is potentially needed by the graphical module, such as a thread start instruction and a conditional jump instruction;
(e) generating, by an executable file generation module of the graphical program which is a key link in the whole compiling method, a byte array corresponding to each module in the graphical program based on the steps (b), (c) and (d), and then connecting the byte arrays of the graphical modules in series into a complete executable file according to a traversal sequence of the graphical program; and
(f) transmitting the executable file generated in the step (e) to the controller through human interface device (HID) or Bluetooth data communication, and executing, by the controller, a corresponding action according to the instruction to realize an expected action effect of the graphical program.

In the automatic compiling method for graphical programming above, the step (b) comprises the following steps of:
(b-1) acquiring a storage structure—forest of the graphical program;
(b-2) traversing a tree structure corresponding to the graphical program, and acquiring a graphical module entity according to a tree node identification (ID):
(b-3) acquiring a corresponding parameter memory allocation table according to a graphical module mode, which comprises a parameter initialization sequence, so as to ensure that relevant actions can be correctly executed;
(b-4) allocating a memory space with a specified size according to a parameter type, and then recording a memory base address allocated to the parameter;
(b-5) performing additional processing on special parameters, comprising a user-defined parameter and a resource-based parameter, so as to ensure that memory requirements of the graphical module and a robustness of the program are met; and
(b-6) generating the graphical program memory allocation table finally to manage and operate a controller memory.

In the automatic compiling method for graphical programming above, the step (c) comprises the following steps of:
(c-1) acquiring the storage structure—forest of the graphical program;
(c-2) deeply traversing a tree structure in the forest, creating a thread if a node is a root node and the thread is a main thread of the graphical program, and recording thread information, which comprises a thread ID and a thread starting module ID;
(c-3) if the node is not the root node, judging a number of child nodes of a father node, and continuing to traverse without any operation if the node is a first child of the father node; and allocating a new thread if the node is not the first child of the father node, and recording thread information;

(c-4) if the node is a leaf node, the node being a termination node of the thread, using an ID of the node as a thread termination ID, and noting that the leaf nodes contained in the graphical program are equal to a number of threads contained in the graphical program; and (c-5) constructing the thread allocation table of the graphical program finally to meet multi-thread management and operation of the graphical program.

After the graphical program is processed in the steps (b) and (c), the graphical program memory allocation table and the graphical program thread allocation table of the graphical program are acquired, and in the following steps (d) and (e), the graphical program is processed based on the graphical program memory allocation table and the graphical program thread allocation table to finally generate the executable file corresponding to the graphical program.

In the automatic compiling method for graphical programming above, the step (e) comprises the following steps of:

(e-1) acquiring the storage structure—forest of the graphical program;

(e-2) traversing the forest according to different functional requirements, the functions mainly comprising overall download of the graphical program, partial download of the graphical program and download of a graphical tree, and then deeply traversing trees in the forest according to specific requirements;

(e-3) acquiring a corresponding graphical module entity according to a tree node ID, and calling an extensible markup language (XML) file corresponding to the graphical module entity according to a graphical module type and a graphical module mode, wherein, when analyzing an XML instruction set corresponding to the graphical module mode, the XML file needs to be analyzed with the help of an instruction to analyze and replace an instruction set contained in the graphical module mode, so as to generate a byte array of the graphical module that meets specific functions;

(e-4) when analyzing and replacing the XML file corresponding to the graphical module mode, a complete byte array of a graphical module mode being unable to be generated, which potentially results in vacancy of a program address and lack of a resource address, filling in the program address with zero firstly to form a semi-complete byte array of a graphical module mode and recording default information of the graphical module, and forming a read-only memory (ROM) (program) address default table of the graphical program finally;

(e-5) allocating the program address of the graphical module in sequence according to a traversal sequence, determining a ROM storage space occupied by the graphical module according to a size of the generated byte array of a graphical module, and finally generating the ROM (program) address allocation table of the graphical program;

(e-6) allocating additional resources needed by the graphical program after allocating the program address of the graphical module, so as to meet resource requirements of the graphical module in the graphical program, such as pictures, sounds and texts;

(e-7) filling in a vacant ROM address in the semi-complete byte array of the graphical module generated in the step (c) according to the ROM address default table of the graphical program and the ROM address allocation table of the graphical program to form the complete byte array of the graphical module; and (e-8) connecting the generated byte array of the graphical module with a resource byte array according to rules to form a byte array that can be finally executed by the graphical program, and then transmitting data to the controller for running through a communication module.

In the automatic compiling method for graphical programming above, the step (c-3) comprises the following steps of:

(e-3-1) acquiring the corresponding graphical module entity according to the tree node ID, so as to further acquire a graphical module type and a graphical module mode;

(e-3-2) acquiring an initialization table of corresponding parameters according to values of the graphical module type and the graphical module mode, and performing initialization operation on parameters with an initialization value-endowing an initial value to a memory address corresponding to the parameter, so as to meet functional requirements of the module;

(e-3-3) acquiring a corresponding instruction set according to the values of the graphical module type and the graphical module mode, analyzing and replacing the instruction through an expression, and acquiring a meaning of each operand in the instruction firstly according to an instruction code, that is, acquiring an addressing mode of the operand;

(e-3-4) each operand in the instruction having different addressing modes, further acquiring an actual value of the operand according to the manner of acquiring the addressing mode of the operand above, and then using the actual value to replace the operand in the instruction, so as to complete the instruction analysis; and (e-3-5) processing the instruction set in the steps (c) and (d) to meet functional requirements of the graphical module in the graphical program, if a vacancy value potentially exists during processing, performing a subsequent operation for filling up, so as to finally form a complete byte array corresponding to the graphical module.

In the automatic compiling method for graphical programming above, software is connected with the controller for data exchange in the step (f), which mainly comprises HID and Bluetooth communication modes, a finally generated program machine language is transmitted to the controller for running through a data communication module, and meanwhile, a state of the controller and an operation status of the program are monitored in real time by connecting the controller to the module, so as to ensure normal operation of the program.

Compared with the prior art, the present invention has the following advantages and technical effects.

In most of the current compiling methods for graphical programming, compiling is performed according to specific compiling frameworks, a compiling process is too complicated and too professional, with high learning costs and high requirements on the controller, a micro-operation system is needed for supporting, and a compiling system itself is inefficient and ineffective. Moreover, the compiling methods for graphical programming in China are very rare and scarce. Aiming at the problems above, the present invention allows software developers to convert a program written by graphical programming into a file which can be directly executed by the controller through the automatic compiling method provided by the present invention, without needing to know complicated knowledge points such as an obscure compiling principle, a run-time structure, an internal relationship of compiling system principles and the like, thus being simple and efficient, and greatly simplifying the compiling implementation of graphical programming.

BRIEF DESCRIPTION OF THE SEVERAL VIEWS OF THE DRAWINGS

FIG. 1 is a flow chart of an automatic compiling method for graphical programming in an embodiment.

DESCRIPTION OF SPECIFIC EMBODIMENTS OF THE INVENTION

The embodiments of the invention are further described below with reference to the drawings, but the implementation of the invention is not limited to the embodiments.

As shown in FIG. 1, a main flow of an automatic compiling method for graphical programming comprises the following steps of:
(a) freely combining, by a user, graphical modules to generate a graphical program;
(b) allocating a memory for a graphical program to generate a graphical program memory allocation table, so as to realize memory management and operation of a controller;
(c) allocating threads for a graphical program to analyze a storage structure of a graphical program to acquire a graphical program thread allocation table, so as to realize multi-thread execution of the graphical program and implement thread management;
(d) analyzing, by a graphical program analysis module, a position of each graphical module in the graphical program according to the storage structure of the graphical program to acquire an extra instruction that is potentially needed by the graphical module, such as a thread start instruction and a conditional jump instruction;
(e) generating, by an executable file generation module of the graphical program which is a key link in the whole compiling method, a byte array corresponding to each module in the graphical program based on the steps (b), (c) and (d), and then connecting the byte arrays of the graphical modules in series into a complete executable file according to a traversal sequence of the graphical program; and
(f) transmitting the executable file generated in the step (e) to the controller through HID or Bluetooth data communication, and executing, by the controller, a corresponding action according to the instruction to realize an expected action effect of the graphical program.

The step (b) comprises the following steps of:
(b-1) acquiring a storage structure—forest of the graphical program;
(b-2) traversing a tree structure corresponding to the graphical program, and acquiring a graphical module entity according to a tree node ID;
(b-3) acquiring a corresponding parameter memory allocation table according to a graphical module mode, which comprises a parameter initialization sequence, so as to ensure that relevant actions can be correctly executed;
(b-4) allocating a memory space with a specified size according to a parameter type, and then recording a memory base address allocated to the parameter;
(b-5) performing additional processing on special parameters, comprising a user-defined parameter and a resource-based parameter, so as to ensure that memory requirements of the graphical module and a robustness of the program are met; and
(b-6) generating the graphical program memory allocation table finally to manage and operate a controller memory.

The step (c) comprises the following steps of:
(c-1) acquiring the storage structure—forest of the graphical program;
(c-2) deeply traversing a tree structure in the forest, creating a thread if a node is a root node and the thread is a main thread of the graphical program, and recording thread information, which comprises a thread ID and a thread starting module ID;
(c-3) if the node is not the root node, judging a number of child nodes of a father node, and continuing to traverse without any operation if the node is a first child of the father node; and allocating a new thread if the node is not the first child of the father node, and recording thread information;
(c-4) if the node is a leaf node, the node being a termination node of the thread, using an ID of the node as a thread termination ID, and noting that the leaf nodes contained in the graphical program are equal to a number of threads contained in the graphical program; and
(c-5) constructing the thread allocation table of the graphical program finally to meet multi-thread management and operation of the graphical program.

After the graphical program is processed in the steps (b) and (c), the graphical program memory allocation table and the graphical program thread allocation table of the graphical program are acquired, as shown in Table 1 and Table 2, and in the following steps (d) and (e), the graphical program is processed based on the graphical program memory allocation table and the graphical program thread allocation table to finally generate the executable file corresponding to the graphical program.

TABLE 1

| Graphical Program Memory Allocation Table | | |
|---|---|---|
| Module ID | Parameter ID | Parameter base address |

TABLE 2

| Graphical Program Thread Allocation Table | | |
|---|---|---|
| Thread ID | Starting module ID | Termination module ID |

In the automatic compiling method for graphical programming above, the step (e) comprises the following steps of:
(e-1) acquiring the storage structure—forest of the graphical program;
(e-2) traversing the forest according to different functional requirements, the functions mainly comprising overall download of the graphical program, partial download of the graphical program and download of a graphical tree, and then deeply traversing trees in the forest according to specific requirements;
(e-3) acquiring a corresponding graphical module entity according to a tree node ID, and calling an XML file corresponding to the graphical module entity according to a graphical module type and a graphical module mode, wherein, when analyzing an XML instruction set corresponding to the graphical module mode, the XML file needs to be analyzed with the help of an instruction to analyze and replace an instruction set contained in the graphical module mode, so as to generate a byte array of the graphical module that meets specific functions;
(e-4) when analyzing and replacing the XML file corresponding to the graphical module mode, a complete byte array of a graphical module mode being unable to be generated, which potentially results in vacancy of a program address and lack of a resource address, filling in the program address with zero firstly to form a semi-complete byte array of a graphical module mode and recording default information of the graphical module, and forming a ROM (program) address default table of the graphical program finally;

(e-5) allocating the program address of the graphical module in sequence according to a traversal sequence, determining a ROM storage space occupied by the graphical module according to a size of the generated byte array of a graphical module, and finally generating the ROM (program) address allocation table of the graphical program;

(e-6) allocating additional resources needed by the graphical program after allocating the program address of the graphical module, so as to meet resource requirements of the graphical module in the graphical program, such as pictures, sounds and texts;

(e-7) filling in a vacant ROM address in the semi-complete byte array of the graphical module generated in the step (c) according to the ROM address default table of the graphical program and the ROM address allocation table of the graphical program to form the complete byte array of the graphical module; and (e-8) connecting the generated byte array of the graphical module with a resource byte array according to rules to form a byte array that can be finally executed by the graphical program, and then transmitting data to the controller for running through a communication module.

After the graphical program is processed in the step (e), a semi-complete executable file of the graphical program is generated, which requires some additional operations and processing to finally generate a complete executable file.

In the automatic compiling method for graphical programming above, the step (c-3) comprises the following steps of:

(e-3-1) acquiring the corresponding graphical module entity according to the tree node ID, so as to further acquire a graphical module type and a graphical module mode;

(e-3-2) acquiring an initialization table of corresponding parameters according to values of the graphical module type and the graphical module mode, and performing initialization operation on parameters with an initialization value-endowing an initial value to a memory address corresponding to the parameter, so as to meet functional requirements of the module;

(e-3-3) acquiring a corresponding instruction set according to the values of the graphical module type and the graphical module mode, analyzing and replacing the instruction through the following expression, and acquiring a meaning (Order_Oprandmode(x1, x2 . . . , xn)) of each operand (Operand) in the instruction firstly according to an instruction code (Order_Code), that is, acquiring an addressing mode (Addressing_Mode) of the operand, wherein the following is used as an example for programmers' reference only without needing to describe the specific meaning in details:

$$\text{Order\_Operandmode}(x1, x2 \ldots, xn) = \quad (7\text{-}1)$$
$$\text{Get\_OrderType}(\text{Order\_Code})$$

$$\text{Order\_Operandmode}(x1, x2 \ldots, xn) = \begin{Bmatrix} \text{Addressing\_Mode}(x_1) \\ \vdots \\ \text{Addressing\_Mode}(x_n) \end{Bmatrix} \quad (7\text{-}2)$$

(e-3-4) each operand in the instruction having different addressing modes, further acquiring an actual value of the operand according to the manner of acquiring the addressing mode of the operand in the expression above, and then using the actual value to replace the operand in the instruction, so as to complete the instruction analysis; and (e-3-5) processing the instruction set in the steps (c) and (d) to meet functional requirements of the graphical module in the graphical program, if a vacancy value potentially exists during processing, performing a subsequent operation for filling up, so as to finally form a complete byte array corresponding to the graphical module.

What is claimed is:

1. An automatic compiling method for graphical programming, comprising the following steps of:
   (a) freely combining, by a user, graphical modules to generate a graphical program;
   (b) allocating a memory for the graphical program to generate a graphical program memory allocation table, so as to realize memory management and operation of a controller;
   (c) allocating threads for the graphical program to analyze a storage structure of the graphical program to acquire a graphical program thread allocation table, so as to realize multi-thread execution of the graphical program and implement thread management;
   (d) analyzing, by a graphical program analysis module, a position in the graphical program of each graphical module in the graphical program according to the storage structure of the graphical program to acquire an extra instruction of the graphical module;
   (e) generating, by an executable file generation module of the graphical program which is a key link in the whole compiling method, a byte array corresponding to each graphical module in the graphical program based on the steps (b), (c) and (d), and then connecting the byte arrays of the graphical modules in series into a complete executable file according to a traversal sequence of the graphical program; and
   (f) transmitting the executable file generated in the step (e) to the controller through human interface device (HID) or Bluetooth data communication, and executing, by the controller, a corresponding action according to the executable file to realize an expected action effect of the graphical program,
   wherein the step (e) comprises the following steps of:
   (e-1) acquiring the storage structure—forest of the graphical program;
   (e-2) traversing the forest according to different functional requirements, the functions mainly comprising overall download of the graphical program, partial download of the graphical program and download of a graphical tree, and then deeply traversing trees in the forest according to specific requirements;
   (e-3) acquiring a corresponding graphical module entity according to a tree node identification (ID), and calling an extensible markup language (XML) file corresponding to the graphical module entity according to a graphical module type and a graphical module mode, wherein, when analyzing an XML instruction set corresponding to the graphical module mode, the XML file needs to be analyzed with the help of an instruction to analyze and replace an instruction set contained in the graphical module mode, so as to generate a byte array of the graphical module that meets specific functions;
   (e-4) when analyzing and replacing the XML file corresponding to the graphical module mode, a complete byte array of a graphical module mode being unable to be generated, which potentially results in vacancy of a program address and lack of a resource address, filling in the program address with zero firstly to form a semi-complete byte array of a graphical module mode and recording default information of the graphical module, and forming a program address default table—read-only memory (ROM) address default table of the graphical program finally;

(e-5) allocating the program address of the graphical module in sequence according to a traversal sequence, determining a ROM storage space occupied by the graphical module according to a size of the generated byte array of a graphical module, and finally generating the program address allocation table—ROM address allocation table of the graphical program;

(e-6) allocating additional resources needed by the graphical program after allocating the program address of the graphical module, so as to meet resource requirements of the graphical module in the graphical program;

(e-7) filling in a vacant ROM address in the semi-complete byte array of the graphical module generated in the step (c) according to the ROM address default table of the graphical program and the ROM address allocation table of the graphical program to form the complete byte array of the graphical module; and (e-8) connecting the generated byte array of the graphical module with a resource byte array according to rules to form a byte array that can be finally executed by the graphical program, and then transmitting data to the controller for running through a communication module.

2. The automatic compiling method for graphical programming according to claim 1, wherein the step (b) comprises the following steps of:

(b-1) acquiring a storage structure—forest structure of the graphical program;

(b-2) traversing a tree structure corresponding to the graphical program, and acquiring a graphical module entity according to a tree node ID;

(b-3) acquiring a corresponding parameter memory allocation table according to a graphical module mode, the parameter memory allocation table comprises a parameter initialization sequence, so as to ensure that relevant actions can be correctly executed;

(b-4) allocating a memory space with a specified size according to a parameter type, and then recording a memory base address allocated to the parameter;

(b-5) performing additional processing on special parameters, comprising a user-defined parameter and a resource-based parameter, so as to ensure that memory requirements of the graphical module and a robustness of the program are met; and (b-6) generating the graphical program memory allocation table finally to manage and operate a controller memory.

3. The automatic compiling method for graphical programming according to claim 1, wherein the step (c) comprises the following steps of:

(c-1) acquiring the storage structure—forest of the graphical program;

(c-2) deeply traversing a tree structure in the forest, creating a thread if a node is a root node and the thread is a main thread of the graphical program, and recording thread information, which comprises a thread ID and a thread starting module ID;

(c-3) if the node is not the root node, judging a number of child nodes of a father node, and continuing to traverse without any operation if the node is a first child of the father node; and allocating a new thread if the node is not the first child of the father node, and recording thread information;

(c-4) if the node is a leaf node, the node being a termination node of the thread, using an ID of the node as a thread termination ID, and noting that the leaf nodes contained in the graphical program are equal to a number of threads contained in the graphical program; and (c-5) constructing the thread allocation table of the graphical program finally to meet multi-thread management and operation of the graphical program.

4. The automatic compiling method for graphical programming according to claim 1, wherein the step (c-3) comprises the following steps of:

(e-3-1) acquiring the corresponding graphical module entity according to the tree node ID, so as to further acquire a graphical module type and a graphical module mode;

(e-3-2) acquiring an initialization table of corresponding parameters according to values of the graphical module type and the graphical module mode, and performing initialization operation on parameters with an initialization value-endowing an initial value to a memory address corresponding to the parameter, so as to meet functional requirements of the module;

(e-3-3) acquiring a corresponding instruction set according to the values of the graphical module type and the graphical module mode, analyzing and replacing the instruction through an expression, and acquiring a meaning of each operand in the instruction firstly according to an instruction code-acquiring an addressing mode of the operand;

(e-3-4) each operand in the instruction having different addressing modes, further acquiring an actual value of the operand according to the manner of acquiring the addressing mode of the operand above, and then using the actual value to replace the operand in the instruction, so as to complete the instruction analysis; and (e-3-5) processing the instruction set in the steps (c) and (d) to meet functional requirements of the graphical module in the graphical program, if a vacancy value potentially exists during processing, performing a subsequent operation for filling up, so as to finally form a complete byte array corresponding to the graphical module.

5. The automatic compiling method for graphical programming according to claim 1, wherein software is connected with the controller for data exchange in the step (f), which mainly comprises HID and Bluetooth communication modes, a finally generated program machine language is transmitted to the controller for running through a data communication module, and meanwhile, a state of the controller and an operation status of the program are monitored in real time by connecting the controller to the module, so as to ensure normal operation of the program.

* * * * *